Oct. 11, 1938.　　　　L. H. STRAYER　　　　2,133,061
ROTARY SORTING MACHINE
Filed Oct. 20, 1936

INVENTOR.
LAWRENCE H. STRAYER
BY *Kwis, Hudson & Kent*
ATTORNEYS

Patented Oct. 11, 1938

2,133,061

UNITED STATES PATENT OFFICE 2,133,061

ROTARY SORTING MACHINE

Lawrence H. Strayer, Kent, Ohio, assignor to The Lamson & Sessions Company, Kent, Ohio, a corporation of Ohio Application October 20, 1936, Serial No. 106,607

2 Claims. (Cl. 209—82)

This invention relates to apparatus for sorting bolts or other articles, and more particularly to an improved machine of this kind which is capable of relatively high speed operation, and which automatically selects and discharges the articles of oversize or irregular character.

An object of my invention is to provide an improved sorting machine having a gauge and an article supplying means, and wherein a movable support operates to repeatedly bring the gauge into position to receive individual articles from the supplying means.

Another object of my invention is to provide an improved sorting machine having a gauge and rotary means operable to supply individual articles in succession to the gauge.

Still another object of my invention is to provide an improved machine for sorting bolts or other articles, having a pair of rotatable drums with peripheral openings adapted to register with each other during rotation, and wherein article gauging and feeding means associated with the openings of the respective drums are brought into cooperating relation during the rotation of the drums.

A further object of my invention is to provide a sorting machine, of the type referred to, having a gauge and a rotary feed device operable to supply individual articles thereto in succession, and wherein means cooperating with the gauge acts to eject articles therefrom.

Still another object of my invention is to provide an improved sorting machine, of the type referred to, having a gauge adapted to permit passage of articles of predetermined characteristics and to temporarily hold other articles, and wherein individual articles are supplied to the gauge during relative rotary movement between the latter and an article feeding means and automatically operated means ejects the articles temporarily held by the gauge.

Other objects and advantages of my invention will be apparent from the following description when taken in conjunction with the accompanying sheet of drawings in which, Fig. 1 is a plan view of an article sorting machine embodying my invention.

Figure 1:
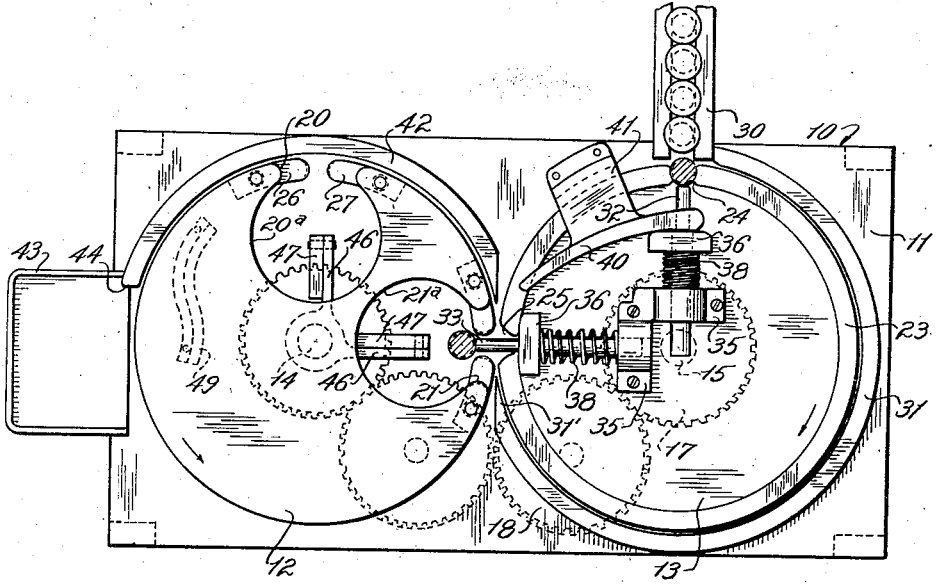

My improved sorting machine is especially useful in the manufacture and handling of bolts and other articles, and operates to sort out articles which are of irregular or unsatisfactory characteristic. In the accompanying drawing to which more detailed reference will presently be made, I have shown my invention embodied in a sorting machine which is adapted to handle threaded bolts or the like, but it should be understood that the invention may be embodied in machines of different form and construction from that herein disclosed and may be applied to the sorting of various other articles.

My improved sorting machine may be provided with a suitable frame or support 10 which, as shown in this instance, may have a generally flat top 11. A pair of disk-like members or drums 12 and 13 may be mounted on shafts 14 and 15 for rotation above the top 11. The drums 12 and 13 lie in substantially the same transverse plane and the shafts 14 and 15 thereof are spaced apart a distance such that the peripheral edges of the drums are just out of contact with each other during rotation. The drums may be of the same diameter and may be connected through suitable means, such as main and idler gears 17 and 18, so that they will rotate at the same speed but in opposite directions simulating the rotation which they would have if they rotated with their peripheral surfaces in contact. The drums may be driven by any suitable power means such as an electric motor having a drive connection with one of the shafts or one of the gears mentioned above.

For a purpose to be presently explained the drum 12 is provided with peripheral openings which are spaced apart circumferentially and which communicate with larger openings or recesses extending inwardly of the drum toward the shaft 14 thereof. In this instance I show two peripheral openings 20 and 21 leading into the larger openings 20a and 21a, although any suitable number of such sets of openings can be provided. The drum 13 is provided around the edge thereof with an upstanding flange or rim 23 which is interrupted at circumferentially spaced points by substantially radially extending openings therethrough. In this instance I show two such radial openings 24 and 25 to correspond in number and arcuate spacing with the openings 20 and 21 of the drum 12, although any suitable number of such openings may be employed so long as they correspond in spacing with the openings of the drum 12. The gearing 17, 18 connecting the drums 12 and 13 is so arranged that the openings 24 and 25 of the drum 13 will register, respectively, with the openings 20 and 21 of the drum 12 as the drums are rotated about their axes.

The drum 12 constitutes the gauge carrying member of my sorting machine and the drum 13 constitutes a part of the article feeding or supplying means. One form of gauge which may be used in my sorting machine comprises a pair of elements 26 and 27 spaced apart a distance which permits the passage therebetween of all articles of satisfactory form or characteristic but which prevents passage of articles of irregular or oversize characteristics. A gauge formed by a pair of such cooperating elements is mounted in each of the peripheral openings of the drum, so that the articles of satisfactory characteristic which pass through the gauges move into the larger openings or recesses 20a and 21a of the drum.

Figure 4:
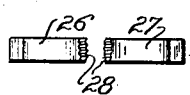
Fig. 4 is a detached view illustrating one form of the gauge elements which may be used in my sorting machine and showing the gauge elements in elevation.

The gauge elements 26 and 27 may be in the form of elongated arcuate blocks conforming substantially to the curvature of the periphery of the drum 12 and having their adjacent ends spaced to provide the desired gauge opening to which the articles are to be presented. When the articles to be sorted are bolts having threaded stems, as in this instance, the adjacent ends of the gauge elements 26 and 27 are provided with teeth or serrations 28, as shown in Fig. 4. If the stems of the bolts being sorted are of proper size and form the threads thereof will mesh with the serrations 28 and the bolts will pass through the gauge opening. If the stem is oversize or if the thread is of improper pitch or form the bolt will not pass through the gauge but will be temporarily retained therein.

The openings 24 and 25 provided in the flange 23 of the drum 13 constitute article receiving pockets which move past the lower end of a magazine or galley 30 containing a supply of the bolts to be sorted. As the openings 24 and 25 pass the lower end of the magazine 30 individual bolts move thereinto as the result of gravity or pressure acting on the supply of bolts in the magazine. When individual bolts are received in the openings 24 and 25 of the drum 13 the stem extends downwardly between the opposed shoulders defining the sides of the openings and is held by these shoulders against shifting circumferentially of the drum. To prevent the bolts from being thrown out of the openings 24 and 25 by centrifugal force I provide an arcuate guard or retaining member 31 adjacent a portion of the periphery of the drum and extending from the magazine 30 around in the direction of rotation to a point adjacent the transfer station at which the openings of the drum 13 register with the openings of the drum 12.

For ejecting the bolts from the openings 24 and 25 of the drum 13 and presenting the same to the gauges of the corresponding openings 20 and 21 of the drum 12 I provide ejectors preferably in the form of plungers 32 and 33. These plungers may be mounted on the drum 13 to move radially outwardly into the article receiving openings 24 and 25 to thereby eject the bolts from these openings and push them into the gauges. The plungers may be slidable in, and guided by, suitable bearings 35 which are mounted on the drum, and each plunger may have a block or shoulder portion 36 thereon in spaced relation to its bearing. A compression spring 38 on each plunger between the bearing 35 and the block 36 normally urges the plunger outwardly toward engagement with the bolt of the corresponding article receiving opening of the drum.

It is desirable to retract the plungers 32 and 33 from the openings 24 and 25 at or just prior to the movement of these openings past the magazine 30, so that the individual articles may pass from the magazine into the openings without interference from the plungers. For this purpose I provide a cam 40, which may be supported above the drum 13 by a bracket 41 extending from the top 11, and with which the block portions 36 of the plungers cooperate. The cam 40 may be an elongated arcuately extending member, as shown in Fig. 1, which is located to be engaged by the block portion 36 of each plunger immediately after the plunger passes the transfer station at which the bolt is ejected from the opening of the drum 13 and pushed into the opening of the gauge. The rotation of the drum 13 occurring just after engagement of the block portion 36 with the cam 40 results in the plunger being retracted as the block portion slides along the inclined cam face and, when the article receiving opening reaches a position opposite the magazine 30, the plunger is fully retracted and the corresponding drum opening is free to receive a bolt from the magazine.

As each article receiving opening moves away from the magazine 30 the block portion 36 of the corresponding plunger leaves the cam 40, whereupon the spring 38 moves the plunger outwardly and causes the bolt to be pressed against the guard member 31. During movement of the article receiving opening or pocket from the magazine 30 to the transfer station, the bolt is retained in its pocket by the guard member and either rolls or slides along the inner surface of the latter. When the bolt-carrying opening or pocket of the drum 13 passes the end 31' of the guard member 31 the bolt is no longer confined radially and the spring 38 then forces the plunger outwardly causing the bolt to be ejected from the pocket and pushed into the opening of the gauge which is then in registry, for example the gauge 21 as shown in Fig. 1. If the article is of the desired predetermined characteristic it passes through the gauge opening and into the larger opening 21a of the drum 12, as indicated in Fig. 1, from which it drops downwardly and passes through an opening of the top 11 into a suitable receptacle.

If the bolt is oversize or of irregular form it will not pass through the gauge opening but will be temporarily held between the gauge elements. As the drums continue to rotate the plunger of the drum 13 separates from the gauge leaving the bolt temporarily held therein and the gauge passes behind an arcuately extending guard 42, see Fig. 2, which prevents the bolts from being thrown out by centrifugal force. When the drum 12 has rotated approximately 180° from the transfer station the gauge arrives at a position over a receptacle 43 and the bolt passes the end 44 of the guard member. At this point the irregular or oversize bolt is ejected from the gauge and drops into the receptacle.

Figure 2:
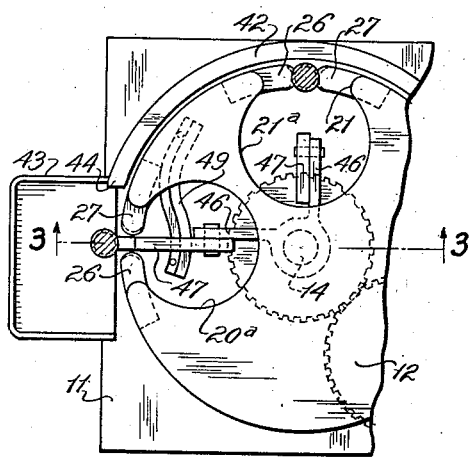
Fig. 2 is a partial plan view thereof but showing the gauge carrying member in a different position.
Figure 3:
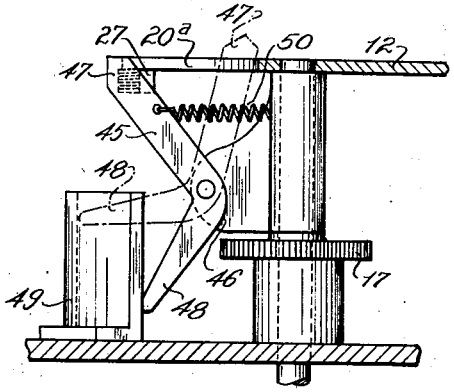
Fig. 3 is a partial transverse sectional view taken through the gauge carrying member and article ejecting means, as indicated by line 3—3 of Fig. 2.
Figure 5:
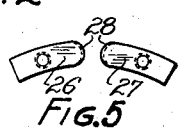
Fig. 5 is a detached plan view of the gauge elements.

For ejecting the irregular or oversize bolts from between the gauge elements I may provide the drum 12 with an ejector device comprising a bell crank lever 45 which may be pivoted on a projection 46 of the drum so that the arm 47 thereof is adapted to swing across the drum opening and move outwardly between the adjacent ends of the gauge elements. The other arm of the bell crank lever extends downwardly in angular relation and forms a trigger 48 which is adapted to engage a cam 49. A tension spring 50 normally holds the lever 45 in retracted position, but when the trigger 48 engages the cam 49 the lever is swung on its pivot and the upper arm thereof moves outwardly between the gauge elements to eject the bolt therefrom. As shown in Fig. 2 the cam 49 is located adjacent the receptacle 43 and causes this outward movement of the ejector to occur immediately after the gauge passes the end 44 of the guard member 42.

Although I have shown the gauge elements 26 and 27 as having teeth or serrations 28, it will be understood, of course, that plain gauge elements may be used if desired when unthreaded bolt blanks or like articles are to be sorted. It will also be understood that various other forms of gauge elements may be employed without departing from the invention.

From the foregoing description and the accompanying drawing it will now be readily understood that I have provided an improved sorting machine which is adapted to be operated at relatively high speed and which automatically selects and discharges those bolts or other articles which are of unsatisfactory or irregular form or characteristic.

While I have illustrated and described the sorting machine of my invention it will be understood, of course, that I do not wish to be limited to the precise details and arrangements herein disclosed, but regard my invention as including such changes and modifications as do not involve a departure from the spirit of the invention and scope of the appended claims.

Having thus described my invention, I claim:

1. In a machine of the character described the combination of a pair of rotatable drums having peripheral openings adapted to register with each other during rotation of the drums, a gauge in the opening of one drum comprising a pair of elements spaced to permit passage of articles of predetermined characteristic and to temporarily retain other articles, means for feeding individual articles to the opening of the other drum, a plunger operable to transfer the individual articles from the opening of said other drum to said gauge, means for actuating said plunger to retract the same adjacent the feeding station and to extend the same adjacent the transfer station, and means for retaining the articles in the opening of said other drum during travel from the feeding station to the transfer station.

2. In a machine of the character described the combination of a pair of rotatable drums having peripheral openings adapted to register with each other during rotation of the drums, a gauge in the opening of one drum comprising a pair of elements spaced to permit passage of articles of predetermined characteristic and to temporarily retain other articles, means for feeding individual articles to the opening of the other drum, a plunger operable to transfer the individual articles from the opening of said other drum to said gauge, means for actuating said plunger to retract the same adjacent the feeding station and to extend the same adjacent the transfer station, means for retaining the articles in the opening of said other drum during travel from the feeding station to the transfer station, and means operable to eject the temporarily retained articles from the gauge.

LAWRENCE H. STRAYER.